2,699,953

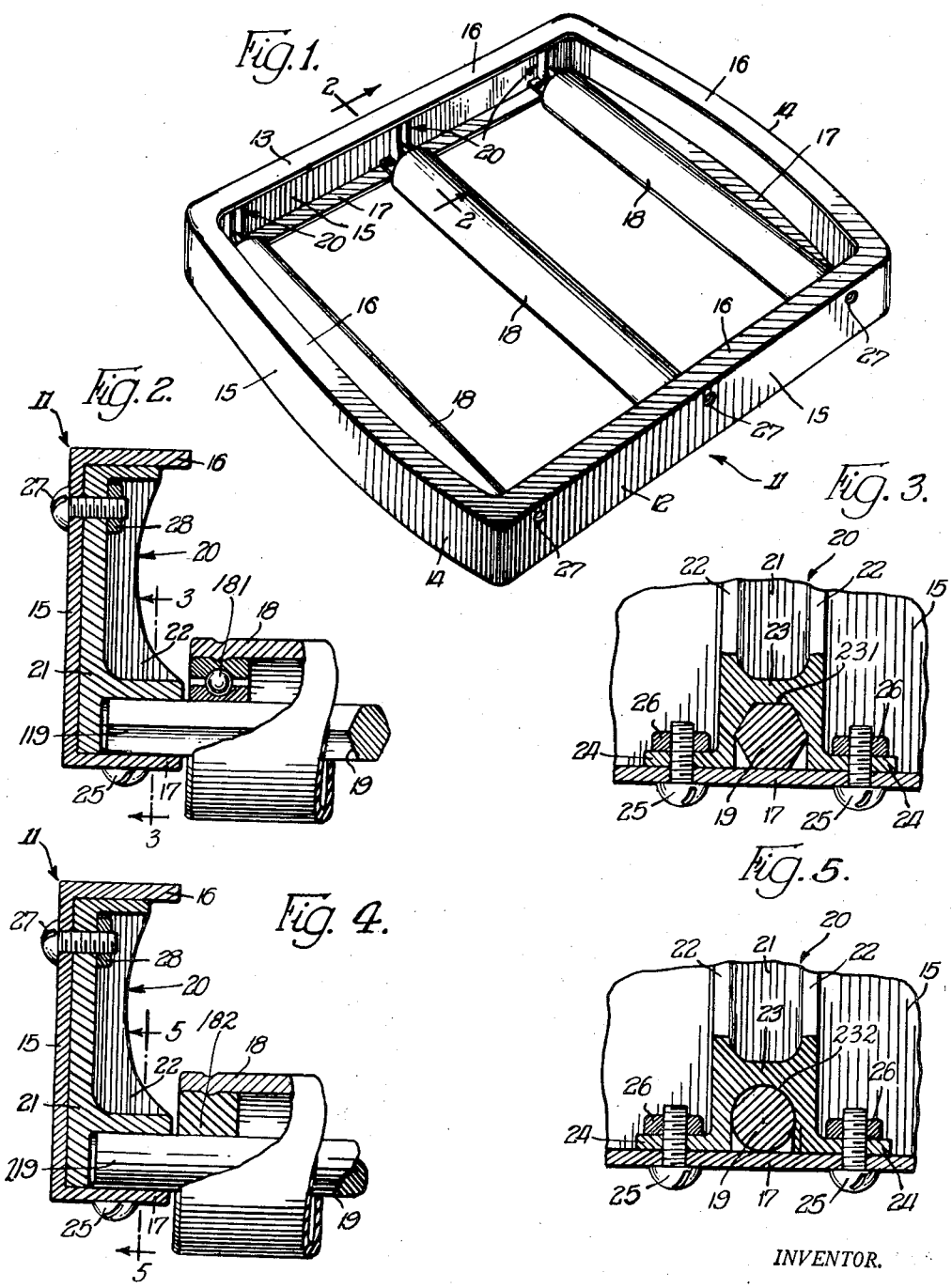
Jan. 18, 1955 — H. F. CHADDICK — 2,699,953
DOLLY FRAME SUPPORTED ON ROLLERS
Filed Oct. 26, 1950
INVENTOR.
BY HARRY F. CHADDICK
Spencer, Johnston, Cook & Root
ATT'YS

United States Patent Office 2,699,953
Patented Jan. 18, 1955

DOLLY FRAME SUPPORTED ON ROLLERS

Harry F. Chaddick, Chicago, Ill.

Application October 26, 1950, Serial No. 192,329

5 Claims. (Cl. 280—79.1)

The present invention relates in general to freight handling and has more particular reference to a carriage or dolly for the short haul transportation of articles to be moved.

An important object of the present invention is to provide a new and improved carriage or dolly of compact, light weight character, yet of rugged construction and particularly well suited for supporting articles, such as freight items, stacked thereon for transportation; a further object being to provide a compact, flat carriage adapted smoothly to traverse rough platform or floor surfaces while supporting substantial loads stacked thereon, whereby the device is especially well suited for the short haul transportation of articles to be moved, as in the loading of cars, trucks, trailers and the like, at freight terminals or transfer locations.

Another important object is to provide a dolly comprising a generally rectangular frame having a plurality of elongated rollers extending transversely of and supported on opposite side members of the frame in position to engage a support floor beneath the dolly; a further object being to form the frame of channel members having upstanding web portions and inwardly extending flange or lip means, and to secure the rollers in the frame upon and upwardly of said inturned flange means, with portions of the rollers extending beneath the flange means in position to engage a support floor or platform.

Another important object is to form the frame of channel members, preferably integrally interconnected at the corners of the frame, and comprising upstanding web portions and inturned upper and lower flange or lip means, providing an exceedingly rigid integral load supporting frame unit; a further object being to connect rollers upon the opposite side members of the frame by means of brackets secured on said side members in position extending snugly between and in engagement with said upper and lower inturned flanges; a further object being to form the brackets with downwardly facing seating means adapted to receive the roller axles and hold the same upon the lower of said inturned flanges and to transmit a substantial portion of a load on the frame to the journaled rollers through said brackets.

Another important object is to provide improved brackets for securing rollers in a frame, said brackets comprising each a plate and integral spaced ribs thereon and formed to extend substantially vertically between inturned flanges of the frame, the brackets each being formed with an axle cavity at one end to receive a roller axle in position to hold the same upon a side of a said inturned flange; a further object being to provide for the detachable mounting of the brackets in the support frame.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a perspective view of a carriage or dolly embodying the present invention;

Fig. 2 is an enlarged sectional view taken substantially along the line 2—2 of Fig. 1;

Fig. 3 is a sectional view taken substantially along the line 3—3 in Fig. 2;

Fig. 4 is an enlarged sectional view, similar to Fig. 2, and illustrating a modified structure embodying the invention; and Fig. 5 is a sectional view taken substantially along the line 5—5 in Fig. 4.

To illustrate the invention the drawings show a carriage or dolly 11 comprising a generally rectangular frame 12 having spaced side members 13 and end members 14 interconnecting the opposite ends of the side members 13. The side members 13 are preferably straight, as shown. The end members 14 may also be straight elements but are preferably outwardly bowed, as illustrated more particularly in Fig. 1. The members 13 and 14 are preferably of channel shaped sectional configuration, comprising upstanding web portions 15 and inturned upper and lower flanges 16 and 17. The frame is preferably made of metal of suitable strength and rigidity. To this end the frame may be made of steel; or aluminum may be utilized to make the device light in weight and hence readily portable. While the members 13 and 14 may be interconnected at their joining corners in any suitable fashion, as by means of welded, riveted or otherwise connected brackets, the members 13 and 14 are preferably interconnected integrally at their joined ends to form the frame 12 as an integral unitary structure.

The carriage 11 also comprises a plurality of elongated support rollers 18 extending transversely of the frame and supported at their opposite ends on the side members 13. The rollers 18 may comprise solid cylindrical elements of steel or other suitable roller material; or the rollers may comprise hollow cylinders. The rollers preferably are long enough to extend, with slight end clearance, between the inwardly facing edges of the flanges 17 of the opposite side members 13 of the frame. The rollers, at their opposite ends, are provided with axles 19, projecting outwardly of the ends of the rollers, in position to overlie upon the flanges 17, on both sides of the frame. Mounting brackets 20 are provided for securing the axles on the frame in spaced apart relationship on the side member 13, so that the axes of the rollers are maintained in parallel spaced relation, with portions of the rollers extending beneath the flanges 17 in position to rest upon a floor or platform and thus support the frame 12 above the floor.

As shown in Figs. 2 and 3, the axles 19 may comprise the opposite ends 119 of rods of non-circular, preferably hexagonal sectional configuration; and the rollers 18 may each comprise a cylindrical sleeve fitted upon the outer race members of spaced roller bearings 181, including a bearing at each end of each roller. In each roller, the axle rod preferably extends in and through the inner race elements of each of the several roller bearings of the roller, said inner race elements being formed to snugly receive the axle rod. Where non-circular axles are employed, the brackets 20 may be formed with cavities 231 shaped in conformity with the non-circular shape of the axle rod ends 119, whereby to receive the ends of the rods and secure the same against rotation with respect to the brackets and the frame 11.

As shown in Figs. 4 and 5, however, the axles 19 may comprise cylindrical members 219 secured fast on the rollers, as by means of mounting members 182, and the brackets 20 may be formed with cavities 232 providing journals to turnably fasten the members 219 on the frame.

The brackets 20 are formed for attachment within the channel shaped side members 13 in such fashion as to transfer, to the roller axles, at least a portion of a load applied on the top of the frame, that is to say, upon the inturned flange portions 16 thereof. To this end the brackets 16 each comprise a generally rectangular web portion or plate 21 of length sufficient to fit snugly between the upper and lower flanges 16 and 17, and a pair of spaced, preferably parallel, strengthening ribs 22, integral with and extending longitudinally of the plate 21, said ribs also being sized to fit snugly between and to bear, at their opposite ends, upon the inner surfaces of the flanges 16 and 17. Each bracket also includes a preferably integral partition 23 extending between the ribs 22, adjacent one end of the bracket, to form an axle seating cavity opening laterally at the end of the bracket, said cavity being sized to receive the axle 19 of a roller. In the embodiment shown in Figs. 2 and 3, in which the roller axles 19 have ends 119 of non-circular sectional shape, the axle cavity 231 in each bracket 23 is preferably formed with relatively inclined flat surfaces for engagement with the corresponding lateral surfaces of the axle, whereby to hold the axle against turning movement in the cavity with respect to the bracket. In the embodiment illustrated in Figs. 4 and 5, however, wherein the axles 19 have ends 219 of cylindrical configuration, the axle cavities 232 of the brackets are of corresponding semi-cylindrical shape to turnably receive the axles therein. On opposite sides of the axle cavity each bracket is formed with outwardly extending flanges 24 in position to engage the upper surface of the lower frame flange 17; and means is provided for securing the flanges 24 upon the frame flange 17, such means preferably comprising headed bolts 25 and cooperating nuts 26, the flanges 17 and 24 being provided with suitable alined openings for the reception of the bolts. Any other suitable means, including welding and riveting, may, of course, be employed for attaching the bracket upon the flange 17, in position to hold a roller axle 19 in the seating cavity and against the upper surface of the flange 17. Means is also provided for securing cavity remote portions of the bracket in the upper portions of the frame, such means preferably comprising a headed bolt 27 and cooperating nut 28, although any other fastening expedient, including riveting and welding, may, of course, be employed. As shown, the bolt 27 extends in alined openings formed in the webs 15 and 21, the nut 28 being disposed between the ribs 22 and hence held against turning movement. Lock washers or other suitable means for preventing the loosening of the fastening bolts 25 and 27 may, of course, be employed.

It will be seen from the foregoing that the present invention provides an exceedingly light weight yet rugged carriage, particularly well suited for use in the transportation of relatively heavy loads, of the order of several thousand pounds, for short distances, over rough surfaces such as warehouse floors, the employment of elongated rollers assuring that the carriage will roll freely and smoothly over rough flooring even when the device is heavily loaded. The device is adapted for use by placing it with its rollers in engagement with a floor, or platform, and then applying a pallet across the top of the frame 11 in position supported by the flange portions 16. Articles to be transported may then be piled or stacked upon the pallet to provide a sizable load upon the carriage. The loaded carriage may then be readily transported by pushing or pulling the same. The device is particularly well suited for the short haul transportation of a load, more or less in a straight line, as along the floor of a freight car or trailer from an inner corner or end thereof to its door or tailgate, thereby minimizing manual transportation by porters in loading or unloading a freight car or trailer. The device also may be employed to advantage in warehouses and wherever short haul carriage facilities are required.

An important aspect of the present invention is the light weight compact construction of the device accomplished by the brackets 20, and the manner of attaching the same in the frame 12. The brackets not only aid in rigidifying and strengthening the light weight frame so that the device may support unusually large loads, and apply the same to the rollers 18 through the medium of a frame structure of exceedingly light weight character. In this connection, it will be noted that a load applied upon the upper frame flange 16 will be transferred to the rollers mainly through the webs 21 and the ribs 22 of the brackets, thereby relieving the frame and web 15 of a substantial portion of the load. The frame 12 thus need merely be made strong and heavy enough to carry its relatively small portion of the load and to maintain the brackets 20 in spaced relation. The brackets 20 and the frame 12 thus mutually cooperate in providing an exceedingly light weight yet rugged and rigid structure capable of supporting relatively enormous loadings.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A load carrying transport dolly comprising a generally rectangular frame having spaced side members of channeled sectional configuration, including vertical web portions and upper and lower inwardly extending flanges integral with said web portions, end members interconnecting and integrally united with the ends of said side members to maintain the same in spaced apart parallel relationship, elongated cylindrical rollers extending between the spaced inner edges of the lower flanges of said side members and having axle pins projecting outwardly, at the opposite ends of said rollers, in position overlying said lower flanges, and bracket means securing said axle pins in spaced relation on said side members and comprising elements sized to extend snugly between said upper and lower flanges, said elements comprising each a plate portion adapted to lie against the inner surface of the web portion of a side member, spaced ribs integral with and extending normally of said plate portion, between said upper and lower flanges, and a transverse partition extending between said ribs, adjacent an end of said bracket, and formed to receive and hold a said axle pin upon said lower flange, and means to detachably secure said bracket means at one end on said lower flange of the frame and at the other end upon the web portion of the frame adjacent the upper flange thereof.

2. A load carrying transport dolly comprising a generally rectangular frame having spaced side members of channeled sectional configuration, including vertical web portions and upper and lower inwardly extending flanges integral with said web portions, elongated cylindrical rollers extending between the spaced inner edges of the lower flanges of said side members and having axles projecting outwardly, at the opposite ends of said rollers, in position overlying said lower flanges, and brackets sized to extend snugly and bracingly between said upper and lower flanges, said brackets each being formed, at the lower end thereof, to provide an axle seat for receiving a said axle, spaced studs on said lower flange for securing the said lower end of each bracket on said lower flange of the frame, on opposite sides of said seat, and fastening means for securing the seat remote ends of the brackets upon the frame, remote from said lower flange, the seat remote end of a said bracket being formed to snugly engage beneath the upper flange of said frame, said bracket comprising a plate portion adapted to lie against the inner surface of the web portion of the frame and spaced ribs integral with and extending normally of said plate portion and extending between the axle seat and the upper flange of said frame to aid in applying the thrust of a load on said upper flange, through said braced ribs, to said axle seat.

3. A load carrying transport dolly as set forth in claim 2, wherein a said axle is formed laterally with a flat surface for engagement with the lower flange of said frame.

4. A load carrying transport dolly as set forth in claim 2, wherein a said bracket seat provides flat relatively inclined surfaces, and a said axle is formed laterally with corresponding relatively inclined flat surfaces for engagement with said seat surfaces, whereby to hold said axle against rotation in said seat with respect to the bracket.

5. A load carrying transport dolly as set forth in claim 2, wherein a said axle is of cylindrical configuration and the axle seat of the corresponding bracket comprises a semi-cylindrical cavity in said bracket.

References Cited in the file of this patent

UNITED STATES PATENTS

| 150,979 | Shepard | May 19, 1874 |
| 399,248 | Deming | Mar. 12, 1889 |
| 518,094 | Crouch | Apr. 10, 1894 |
| 746,816 | Goddard | Dec. 15, 1903 |
| 1,002,091 | Storck | Aug. 29, 1911 |
| 2,548,054 | Pinto | Apr. 10, 1951 |
| 2,554,398 | Brei | May 22, 1951 |
| 2,593,089 | Barry | Apr. 15, 1952 |

FOREIGN PATENTS

| 18,909 | Great Britain | Nov. 19, 1898 |